June 11, 1968  R. P. FREEDMAN  3,387,471
SYSTEM TO AUTOMATICALLY CONTROL GAGE AND THE LIKE
Filed Feb. 4, 1966  2 Sheets-Sheet 1

INVENTOR.
ROBERT P. FREEDMAN
BY Brumbaugh, Free,
Graves & Donohue
his ATTORNEYS

United States Patent Office 3,387,471
Patented June 11, 1968

3,387,471
SYSTEM TO AUTOMATICALLY CONTROL
GAGE AND THE LIKE
Robert P. Freedman, Ledyard, Conn., assignor to General Dynamics Corporation, New York, N.Y., a corporation of Delaware
Filed Feb. 4, 1966, Ser. No. 525,036
12 Claims. (Cl. 72—9)

ABSTRACT OF THE DISCLOSURE

A rolling mill control system using the mass flow principle is provided with automatic control of the output thickness of the rolled material by modifying a measurement of the input thickness deviation from nominal thickness in accordance with the nominal draft ratio of the mill to compute the adjustment signal for the mill.

---

This invention relates generally to methods and means to control an output dimensional characteristic of material which is subjected to rolling, drawing or some other elongating action. More particularly, this invention relates to methods and means of the described sort for providing automatic output gage control in rolling mills, adjustable die drawing installations and the like. While the invention is particularly well adapted for cold rolling mills, it is also useful in hot rolling and other applications.

Considering the invention as applied to obtaining automatic gage control in rolling mill operations, various proposals for systems directed to that end have previously been made, and examples of such proposals will now be considered.

In the "follow-on" gage system, a thickness gage following the mill stand measures the thickness of material leaving the stand and feeds back appropriate corrective signals as required to control devices which govern, say, screw setting or tension. Because of the time which necessarily elapses between the actual rolling of a given portion of the material and the arrival of the same portion at the thickness gage, a "follow-on" system is limited in its capability to control rapid changes in gage.

In "gagemeter" systems, the loading of the mill stand by the material being rolled is converted by load sensing means into a signal representative of gage variations. Gagemeter systems have the disadvantage that they do not provide an absolute gage control without some external gage to calibrate them on a follow-on basis. This is so, since the factors measured in a gagemeter system are stand force and/or screw position, and both of such factors are indirect measurements rather than direct measurements of gage or gage changes. In situations where the relationships between force and gage changes are notably non-linear, as in cold mills with wide speed ranges, gagemeter systems are not very suitable and are seldom used.

Mass flow systems (as exemplified by U.S. Reissue Patent 25,075 to Hessenberg, U.S. Patent 3,000,243 to Stringer, and U.S. Patents 3,015,974, 3,054,311 and 3,121,-354 to Orbom et al., Murtland et al., and Weremeychik, respectively) are based on the principle that the mass flow rate of material into a stand equals the mass flow rate of material out of that stand. One disadvantage of previously proposed mass flow systems is that, in order to arrive at the appropriate correction signal, they make computations which substantially throughout are based upon the full actual input thickness and the full actual entering and leaving lengths of material being rolled rather than upon the deviations of those parameters from nominal or ideal values. This means that, because the deviations of those parameters are only small percentages (e.g., 10% at the most) of the full values of such parameters, it is necessary (to provide a given order of accuracy of output gage control) that the computing components of the system have a substantially greater inherent accuracy of computation than if the computations were entirely or mostly based on the mentioned deviations.

Another disadvantage of many of such previously proposed mass flow systems is that they are inherently expensive in construction and circuitry and, hence, are not, as a practical matter, adapted for use on inexpensive mill installations. That practical limitation on use arises out of the economic consideration that, in the case of any mill, the cost of a control system for the mill cannot be disproportionately large in relation to the value of the rest of the mill installation.

It is accordingly an object of this invention to provide a control system which is free of the above-noted disadvantages.

Another object of the invention is to provide a control system which can be used in a variety of applications and can be designed and constructed to suit the individual application while retaining its inherent advantages for all.

A further object of the invention is to provide a control system in which the cost of the system can be varied in accordance with the requirements for accuracy of product gage, but without simply cheapening the components.

These and other objects are realized according to the invention by deriving a plurality of signals from measurements made on material being rolled, drawn or otherwise processed at a station by adjustable material-forming means so as to produce an elongation of such material. A first of such signals is representative of the deviation of the actual value of an input dimensional characteristic from a nominal or ideal value for such characteristic. That characteristic is a dimensional characteristic transverse to the direction of elongation of the material and is, for example, the gage of strip being rolled, the wall thickness of tubing being drawn and the like. A second of such signals is representative of the deviation from nominal or ideal value in the actually obtained draft ratio, i.e., the ratio of the length per unit time (or velocity) of material approaching the station to the length per unit time (or velocity) of the material leaving the station.

Each of the first and second signals is a deviation signal because it is representative of an actual deviation from a nominal or ideal value for a parameter rather than being representative of the full actual value of the parameter (full actual value being equal to the algebraic sum of nominal value and actual deviation). Commercial isotope, contact, and X-ray gauges are usually designed to give deviation signals. Evidently a deviation signal may be weighted by a factor of other than 1.0 and still retain its character as a deviation signal.

The described first and second signals are combined in an appropriate manner with respective appropriate weightings to yield a third signal which is representative of the deviation from nominal or ideal value of the inferred or predicted output value for the mentioned dimensional characteristic (e.g., gage) of the material. That third signal is then utilized as a control signal to correct the operation being performed on the material, the nature of the correction being such as to reduce to zero or to tend to reduce to zero the last-mentioned deviation.

For a better understanding of the invention, reference is made to the following detailed description of a representative embodiment thereof and to the accompanying drawings wherein.

Figure 1:
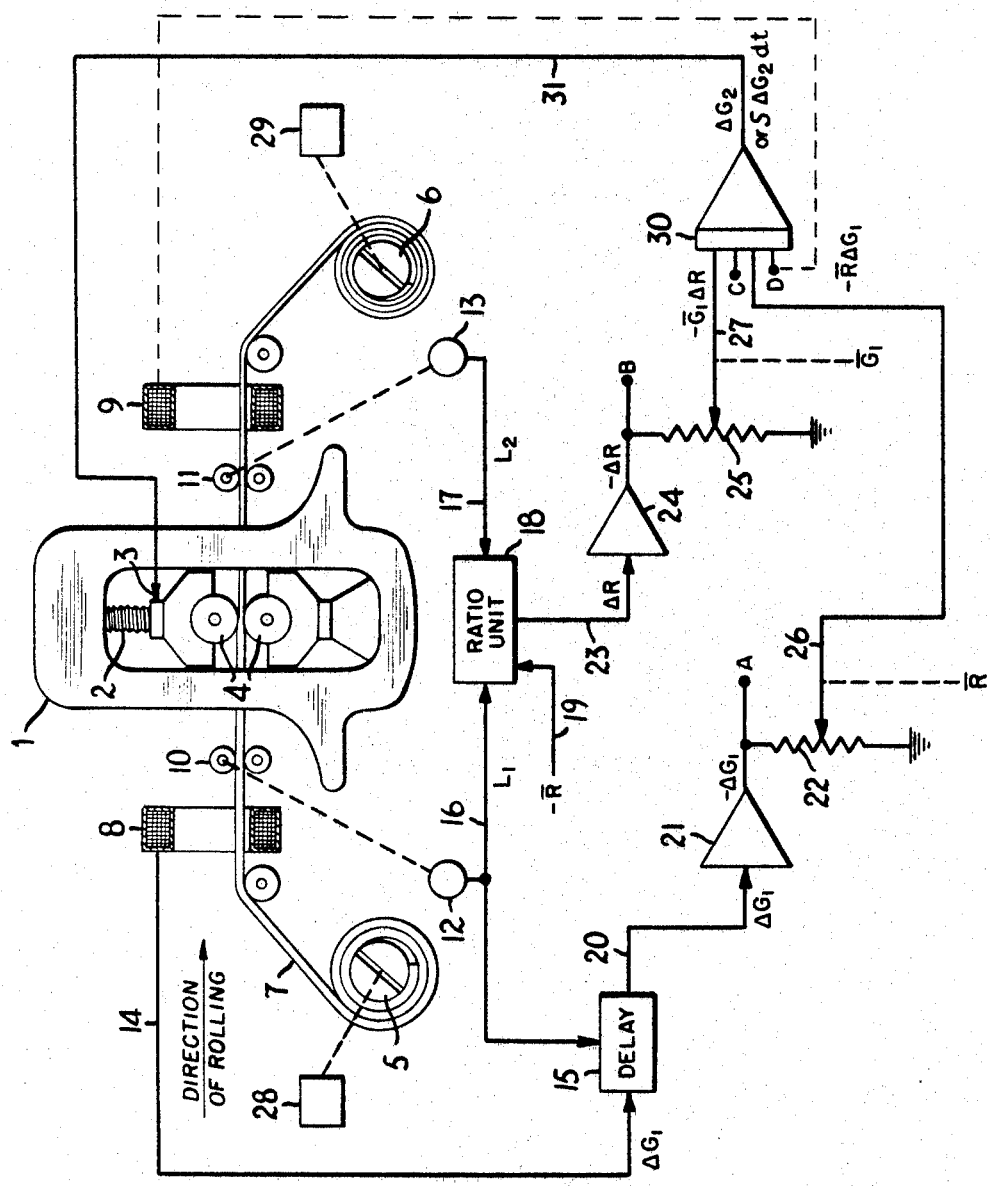
FIG. 1 is a schematic view of an exemplary control system in accordance with the invention.

Considering the principle of operation of the FIG. 1 system, in a rolling or drawing operation; the mass flow rate of material entering the rolls or dies must equal that leaving. Hence:

$$\frac{dM_1}{dt} = \frac{dM_2}{dt} \qquad (1)$$

where $M_1$ = mass entering the rolls or dies
$M_2$ = mass leaving the rolls or dies
$t$ = time, or:

$$\frac{d(p_1 W_1 L_1 G_1)}{dt} = \frac{d(p_2 W_2 L_2 G_2)}{dt} \qquad (2)$$

where $p_1$ and $p_2$ = density of material entering and leaving
$W_1$ and $W_2$ = width of material entering and leaving
$L_1$ and $L_2$ = length of material entering and leaving
$G_1$ and $G_2$ = gage of material entering and leaving.

For most cases $p_1 = p_2$, and, for strip which is much wider than thick (25 or 50 times and more), $W_1 \pm W_2$ so as to reduce Equation 1 to:

$$\frac{d(L_1 G_1)}{dt} = \frac{dL_2 G_2}{dt} \qquad (3)$$

In Expression 3, $G_1$ and $G_2$ are not really time-dependent, so:

$$V_1 G_1 = V_2 G_2 \qquad (4)$$

where $V_1$ and $V_2$ are entering and leaving velocities.

In the embodiment described herein, it will be found most convenient to measure $V_1$ and $V_2$ by counting tachometer pulses over suitable short periods of time, so henceforth the terms $L_1$ and $L_2$ are used for entering and leaving lengths with the understanding that measurement of $L_1$ and $L_2$ over a common period of time is implied, and hence:

$$L_1 G_1 = L_2 G_2 \qquad (5)$$

is dimensionally correct and equivalent to:

$$V_1 G_1 = V_2 G_2 \qquad (6)$$

where $V_1$ and $V_2$ are entrance velocity and exit velocity, respectively. Expression 5 converts to:

$$G_2 = \frac{L_1 G_1}{L_2} \qquad (7)$$

Since the draft ratio $$R = \frac{L_1}{L_2} \qquad (8)$$

from 7 and 8 it follows that:

$$G_2 = R G_1 \qquad (9)$$

Now, let $\overline{G_2}$, $\overline{R}$ and $\overline{G_1}$ represent the nominal values of these quantities in an ideal situation. Specifically, let $\overline{G_1}$ represent the nominal or desired value of input gage, $\overline{R}$ the nominal or desired value of the draft ratio, and $\overline{G_2}$ the nominal or desired value of the inferred or predicted output gage. From 9 it follows directly that:

$$\overline{G_2} + \Delta G_2 = (\overline{R} + \Delta R)(\overline{G_1} + \Delta G_1) \qquad (10)$$

or:

$$\Delta G_2 = \overline{R}\overline{G_1} + \Delta R \overline{G_1} + \overline{R}\Delta G_1 + \Delta R \Delta G_1 - \overline{G_2} \qquad (11)$$

Note:

$$\overline{L_1}\overline{G_2} = \overline{L_2}\overline{G_2} \qquad (12)$$

or:

$$\frac{\overline{L_1}\overline{G_1}}{\overline{L_2}} = \overline{G_2} \qquad (13)$$

but:

$$\frac{\overline{L_1}}{\overline{L_2}} = \overline{R} \qquad (14)$$

Therefore:

$$\overline{R}\overline{G_1} = \overline{G_2} \qquad (15)$$

and $$\overline{R}\overline{G_1} - \overline{G_2} = 0 \qquad (16)$$

whence, from (11) and (16):

$$\Delta G_2 = \Delta R \overline{G_1} + \overline{R} \Delta G_1 + \Delta R \Delta G_1 \qquad (17)$$

Considering, the third term $\Delta R \Delta G_1$ in (17), in most cases $\Delta G_1$ will be $.05 G_1$ or less, and at worst $.1 G_1$, similarly $\Delta R$ will be $.1$ to $.05 R$ at most unless the initial setting of the mill is very faulty. The term $\Delta R \Delta G_1$ is greatest as $G_1$ approaches $G_2$, i.e., at small reductions. In that case, using the largest anticipated deviations, $$\Delta R \Delta G_1 = .1 \times .1 = .01 \text{ or } 1\% \text{ of } \Delta G_2. \qquad (18)$$

As $\Delta G_1$ and $\Delta R$ decrease (in successive passes in a reversing mill, for example), the considered term decreases even faster so as to reduce to, say, a value of:

$$\Delta R_1 \Delta G_1 = .02 \times .02 = .0004 \text{ or } .04\% \text{ of } \Delta G_2. \qquad (19)$$

Value (19) is, of course, negligible, especially since the term approaches zero rapidly as illustrated by the examples above.

For the foregoing reasons, it can be seen that $\Delta R \Delta G_1$ can be eliminated from (17) without significant loss of accuracy except in cases where $G_1$ varies extremely widely or the highest possible accuracy is required. That is, expression (17) can then be written:

$$\Delta G_2 = \Delta R \overline{G_1} + \overline{R} \Delta G_1 \qquad (20)$$

Expression (20) provides a simple relation for deriving a control or correction signal $\Delta G_2$ which, to a close approximation, reflects by its value the true value of the deviation $\Delta G_2$ of inferred output gage from its desired or nominal value. By feeding the signal $\Delta G_2$ as derived from relation (20) a screwdown controller or tension controller, $\Delta R$ is varied and $\Delta G_2$ is driven to zero. Thus the control system is a true closed loop servomechanism.

Turning now to the drawings, FIGS. 1–5 show an embodiment of a gage control system which is in accordance with the invention, and which is of "hybrid" type in that it uses both analog and digital techniques. It is obvious that systems in accordance with the invention could be completely analog or completely digital, depending on convenience and the desired balance of cost and accuracy.

In FIG. 1, the control system is installed in a single stand reversing mill 1, having two or more work rolls 4 held in working relationship by screw 2 and screwdown actuator 3.

Where high accuracy is important, especially in mills rolling at speeds of over 2–400 feet per minute, it is best if the actuator is the high response wedge actuator described in copending Application Ser. No. 405,749 owned by the assignee hereof. Otherwise the actuator 3 may be eliminated and adjustment made by means of the screws 2 driven by electrical or hydraulic motors in the conventional manner. In FIG. 1, actuator 3 comprises the actuator itself and its electronic equipment so as to provide a complete positioning servomechanism.

Material 7 is uncoiled from mandrel 5, rolled through the millstand 1 (left to right in FIG. 1) and then recoiled on mandrel 6. For convenience and conciseness of explanation, the description herein is confined to rolling in only one direction, e.g., the direction shown. It is to be understood, however, that the invention is of application in connection with reversible mills as well as mills adapted to roll in one direction only.

Also, although a single stand rolling mill is shown, the system is not limited to single stand rolling mills, and the description following is equally valid if mandrel or reel 5 or 6 or both are replaced by the other stand or stands of a tandem mill.

In operation, thickness gage 8 measures the deviation $\Delta G_1$ from nominal or desired value $\overline{G}_1$ in incoming gage and sends signals representative of this $\Delta G_1$ to the delay unit 15. Tachometer roll 10 drives pulse tachometer 12 providing synchronizing signals to delay unit 15. The delay unit serves to hold the $\Delta G_1$ signals for a time equal to the time required for the strip to travel from the jaws of gage 8 to the rolls 4.

Tachometer 12 and identical tachometer 13 (driven by roll 11) supply pulses representative of $L_1$ and $L_2$, respectively, to ratio unit 18. Here the ratio of the pulses is measured, this being equivalent to $\overline{R}+\Delta R$. The quantity $-\overline{R}$ is introduced by a manual setting of a voltage on wire 19 and the ratio unit adds $\overline{R}+\Delta R$ to $-R$, sending a signal representative of $\Delta R$ along wire 23 to operational amplifier 24, which inverts it to $-\Delta R$. Similarly, $\Delta G_1$ is sent via wire 20 to operational amplifier 21, which inverts it to $-\Delta G_1$. Operational amplifiers 21 and 24 are direct coupled highly stable amplifiers of the type used in analog computers. Their primary purpose is to avoid loading errors in the potentiometers which they drive.

The signal $-\Delta G_1$ from amplifier 21 is applied to potentiometer 22. The slide or wiper of potentiometer 22 is set to a value proportional to $\overline{R}$. The voltage on the slide with respect to ground is therefore $-\overline{R}\Delta G_1$. In similar fashion, $-\Delta R$ is applied from amplifier 24 to potentiometer 25 and the wiper of potentiometer 25 is set to a value proportional to $\overline{G}_1$. The voltage on the wiper, then, is $-G_1\Delta R$.

The signals $-\overline{R}\Delta G_1$ and $-\overline{G}_1\Delta R$ are brought to amplifier 30 by wires 26 and 27, respectively. The amplifier inverts the sum of those input signals to yield an output signal $\Delta G_2$ in accordance with the operation:

$$-(-\overline{R}\Delta G_1 - \overline{G}_1 \Delta R) = \overline{R}\Delta G_1 + \overline{G}_1 \Delta R = \Delta G_2 \quad (21)$$

As will be noted, the middle portion of operation (21) is an exact electrical simulation of the right hand side of mathematical expression (20), wherefore it is evident from (20) that the signal $\Delta G_2$ derived from operation (21) is closely approximate in value to the true deviation $\Delta G_2$ of inferred output gage from the nominal or desired value $\overline{G}_2$ of such inferred output gage.

The signal $\Delta G_2$ is then taken to screwdown actuator system 3 via wire 31. Alternatively $\Delta G_2$ may be used to control tension controllers 28 and 29 or any combination of the three may be used. Because screwdown actuator 3 will typically be a position controlled servomechanism, it will be necessary to have some means to prevent it from returning to its rest position each time it has moved sufficiently to reduce $\Delta G_2$ to zero. This is conveniently achieved as shown by making amplifier 30 an integrator having a constant of integration selected to suit the operating speed of the mill and the magnitude of variations encountered.

Figure 2:
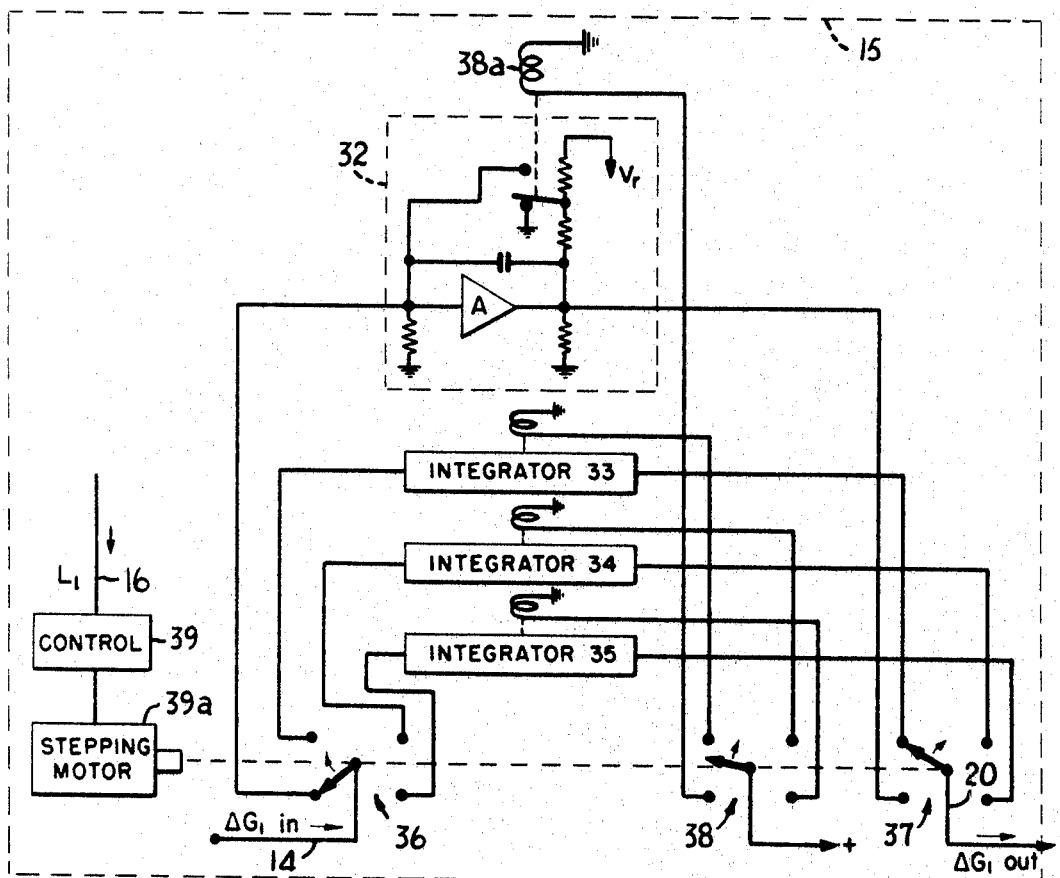
FIG. 2 is a schematic view of details of an embodiment of the delay unit in the system of FIG. 1.

FIG. 2 shows an exemplary simple delay unit 15. Depending on the distance of gage 8 from stand 1 and the degree of resolutions required, more or fewer integrators than the four shown will be used.

In FIG. 2, the signal $\Delta G_1$ from gage 8 is brought via wire 8 to a switch deck 36 of which the wiper distributes signal $\Delta G_1$ in rotation to integrators 32, 33, 34, 35. As exemplified by element 32, each of the integrators is a conventional D.C. operational integrating amplifier. The outputs of the integrators are connected in rotation to output lead 20 through a switch deck 37 of which the rotary wiper moves synchronously with and leads by one switch position the wiper of deck 36. Ordinarily, the capacitor of each integrator (see unit 32) is connected without by-passing between the input and output of the amplifier of the integrator so that the integrator is in the "hold" mode of operation to store the input signal received by the integrator. Between the time, however, that the signal $\Delta G_1$ stored by any integrator is supplied to the output line 20 by switch deck 37 and the time that the next input signal $\Delta G_1$ is supplied to that integrator through switch deck 36, such integrator is cleared or reset by the action of a switch deck 38 of which the rotary wiper moves synchronously with those of decks 36 and 37 and is space-phase positioned intermediate the wipers of decks 36 and 37. As the wiper of deck 38 moves past each fixed contact of that deck, such wiper momentarily energizes the winding of a relay 38a associated with the integrator corresponding to such contact. Each such relay winding when energized actuates a movable contact of the relay so as to have the effects in the associated integrator of (1) creating for the integrating capacitor a resistive by-pass current path which discharges the capacitor of the signal previously stored thereby, (2) charging the capacitor to a reference voltage level $V_r$ which is individual to that integrator, and which may be zero voltage level. The operation of switch deck 38 will be evident from the showing in FIG. 2 of the deck itself, the details of integrator 32 and the relay 38a associated with the last-named integrator.

To maintain synchronism with the strip, pulses from tachometer 12 (or any source closely related to the strip speed) are taken to motor control unit 39. This drives stepping motor 39a, turning the rotating wipers of switch decks 36, 37 and 38 in correspondence with strip motion. Each step of motor 39a moves each of the wipers of decks 36–38 through an angular interval equal to that between two adjacent respective fixed contacts of those decks. The control unit 39 and motor 39a may be the SLO–SYN type as manufactured by Superior Electric Company.

It should be emphasized that FIG. 2 is drawn to illustrate a concept and is purposely simplified to aid understanding of the switching sequence. In actual practice, either the sequence shown or a similar sequence would be used, but the sample-and-hold circuitry would be more complicated.

In the event that less accuracy is satisfactory in a given application, and the time delays are not excessive, capacitors may replace the integrating amplifiers shown with a cost saving. Conversely, where high accuracy and resolution are mandatory, the $\Delta G_1$ signal may be converted into digital form and stored in a series of shift registers as described in U.S. Patent 3,197,986 to Freedman et al. Where a digital solution of the control equation is used, it will normally be desirable to make the delay digital.

Figure 3:
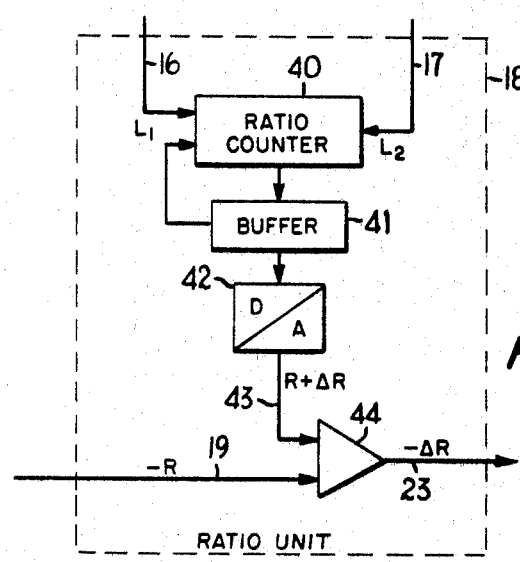
FIG. 3 is a schematic view of details of an embodiment of the ratio unit of FIG. 1.

FIG. 3 illustrates a method of calculating $\Delta R$. Pulses representing $L_1$ and $L_2$ are brought to a ratio counter 40. A ratio counter is really a pair of counters, one preset to the denominator of the function. For example, if we wish to find the ratio $A/B$, the preset B counter is set to N, an arbitrary value of B. Then the other counter adds A counts until the preset counter receives the preset number of counts. The A counter then has a total count M such that $M/N=A/B$ where, as stated, N is the value of the preset number. Where the ratio is displayed in decimal form, N will usually be chosen to be some power of 10 so that the ratio can be read directly. (Example: if A is 1 Hz. and B is 2 Hz., set $N=1,000$, the A counter will stop at 500, and $$\frac{A}{B} = \frac{M}{N} = \frac{500}{1000}$$

or .5). This sort of counter is commercially available from Hewlett-Packard.

The ratio is stored in buffer register 41 between counts and converted into analog form by digital-to-analog converter 42. This ratio represents $\overline{R}+\Delta R$. Adding this ratio to $-\overline{R}$ in amplifier 44 gives $\Delta R$ on wire 23.

In a digital system, the addition of $-\overline{R}$ to $\overline{R}+\Delta R$ would be done digitally, eliminating the converter and amplifier. At the other extreme, cost would be less using two D.C.

tachometers and an analog multiplier, at a lower overall accuracy.

Figure 4:
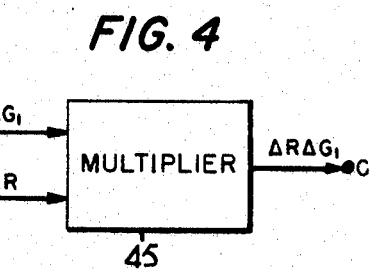
FIG. 4 is a schematic view of a unit which is optionally addable to the FIG. 1 system to provide a modification thereof.

FIG. 4 shows the manner in which an analog multiplier 45 may be added to the FIG. 1 system to include the term $\Delta R \Delta G_1$, previously discarded. The terminals A, B, and C in FIG. 4 are shown also in FIG. 1. In a digital embodiment using a computer there would be no significant advantage to neglecting such term.

No mention has yet been made of thickness gage 9, like gage 8 an X-ray, isotope or contact type gage. In the direction of rolling shown, gage 9 may be used to provide follow-on gage action, correcting for errors in $\Delta G_2$ caused by component variations, etc. Corrections from follow-on gage 9 are introduced through a filter (not shown) to amplifier 30 at point D.

The gage 9 opeartes in the FIG. 1 system as follows. Assume that, because of inaccuracies in the measuring components of the system, the value of the $\Delta G_2$ signal is off by a small factor $k$ from $\Delta G_{2a}$ which is the actual deviation of the output gage from the nominal value $\overline{G}_2$ for output gage. That is $\Delta G_2 + k = \Delta G_{2a}$. Now, if actuator 3 were corrected only by the $\Delta G_2$ signal (which represents an inferred or predicted deviaion rather than a measured deviation), even though the $\Delta G_2$ signal by closed-loop action were driven to zero value, the small bias error $k$ would remain (i.e., actual output gage would equal $G_2 + k$), and the system would have no way of knowing of the presence of error $k$ in the obtained output gage.

The gage 9, however, supplies to amplifier 30 a signal $\Delta G_{2a}$ which is a measure of the actual deviation of the output gage from its nominal value and which, thus, includes the factor $k$ in the value of the signal. Hence, even if the FIG. 1 system by closed-loop action drives the $\Delta G_2$ signal to zero, the $\Delta G_{2a}$ signal, although concurrently reduced, will have remaining a residual value representing $k$. Such residual value $\Delta G_{2a}$ signal operates through amplifier 30 on actuator 3 to make a further small adjustment of that actuator so as to completely or substantially eliminate the presence of the factor $k$ in the operation of the system. Thereafter, the system operates virtually free of factor $k$ until further changes, if any, in the components of the system may introduce a new $k$ which is subsequently corrected for by the monitoring action of gage 9 in the manner already described.

The employment of a follow-on thickness gage to provide supplemental gage correction by a monitoring action as described is of itself not new in the art and is disclosed, for example, in U.S. Patent 2,883,895 to Vossberg. It is believed, however, that the use of such a monitoring action in a system of the sort disclosed herein is new to the art.

Reverting to FIG. 3, if desired, the summing amplifier 44 may be eliminated from ratio unit 18 in a manner as follows: Evidently:

$$\overline{R} + \Delta R = \frac{\overline{L}_1 + \Delta L_1}{\overline{L}_2 + \Delta L_2} \quad (22)$$

When used, however, in connection with the ratio counter 40 the term $(\overline{L}_2 + \Delta L_2)$ can be set qeual to an arbitrary number N where N is, say, 1,000. Also the term $\overline{L}_1$ can be replaced by a term M of such value that $$R = \frac{M}{N} \quad (23)$$

Thus, Expression 22 can be written as:

$$R + \Delta R = \frac{M}{N} + \frac{\Delta L_1}{N} \quad (24)$$

and by subtracting the equalities set out by (23) from both sides of (24), we arrive at:

$$\Delta R = \frac{\Delta L_1}{N} \quad (25)$$

The mathematical relation established by (25) is implemented in practice as follows: The $L_2$ counter of unit 40 is present to a count of N so as to cause a readout from that unit when the received $L_2$ pulses reach the count of N. The $L_1$ counter is preset to a count of $-M$. At the time of readout, the count registered by the $L_1$ counter in response to the $L_1$ pulses will differ from zero (either positively or negatively) by a count representative of $\Delta L_1$. Hence, the readout value from unit 40 will be $\Delta L_1/N$ which equals $\Delta R$. Because the signal derived from unit 40 represents $\Delta R$, line 43 can be directly connected (FIG. 3) to line 23 so as to permit elimination of amplifier 44 and, also, line 19 and the potentiometer (not shown) which supplies the $-R$ voltage to that line. Moreover, either one or both of amplifiers 21 and 24 (FIG. 1) can be eliminated by reversing the polarity of the signal shown in FIG. 1 as supplied to the amplifier in the instance where it is not necessary to minimize loading errors on the potentiometer shown in FIG. 1 as connected to the output of the amplifier in question.

The analog components of the FIG. 1 system (i.e., the amplifiers, integrators and potentiometers) are commercially available, those of the PC-12 series made by Electronic Associates, Inc. being especially suitable.

The above-disclosed embodiments being exemplary only, it is to be understood that additions thereto, modifications thereof and omissions thereof can be made without departing from the spirit of the invention, and that the invention comprehends embodiments different in form and/or detail from those specifically described or shown herein. Accordingly, the invention is not to be considered as limited save as is consonant with the recitals of the following claims.

I claim:

1. A control system for an installation wherein moving material is operated on by material-working means to undergo a reduction in at least one dimension transverse to the movement direction and wherein the degree of reduction is controllable by adjustable means, said system comprising, computer means responsive to respective signals of the actual deviation from a nominal value of said dimension on the input side of said working means and of the actual deviation from a nominal value in the draft ratio characterizing such material in the course of said reduction to derive for control of said adjustable means a correction signal of which at least a component is representative of the inferred deviation in said dimension on the output side of said working means from a nominal value for such output dimension.

2. A system as in claim 1 in which said working means and said material are, respectively, a rolling mill and strip being rolled by such mill, and in which said dimension is the gage of such strip.

3. A system as in claim 2 in which said rolling mill is constituted of a single stand.

4. A system as in claim 1 in which said adjustable means is actuator means for controlling said working means, said actuator means being responsive to said correction signal to control through said working means the degree of reduction of said material.

5. A system as in claim 1 in which said computer means is responsive to the actual deviation in said dimension on the output side of said working means from a nominal value to include it as a factor in the deriving of said correction signal.

6. A control system for an installation wherein moving material is operated on by material-working means to undergo a reduction in at least one dimension transverse to the movement direction, said installation including dimension sensing means on the input side of said working means to provide a first signal representative of the actual deviation in said dimension on said side from a nominal value for such input dimension, and said installation further including adjustable means to control the reduction of said material and, also, separate velocity sensing means disposed on opposite sides of said working means to provide respective length/time signals representative, respectively, of the approaching and leaving velocities relative to said working means of said material, said system comprising, first computing means responsive to said velocity signals to derive a second signal representative of the actual deviation in the draft ratio characterizing said material in the course of said reduction from a nominal value for said draft ratio, and second computing means responsive to said first and second signals to derive for control of said adjustable means a third correction signal of which at least a component is representative of the inferred deviation in said dimension on the output side of said working means from a nominal value for such output dimension.

7. A system as in claim 6 further comprising delay means interposed in circuit between said dimension sensing means and said second computing means to delay said first signal for a time period commensurate with the distance of said sensing means from said working means divided by the velocity of said material towards said working means.

8. A system as in claim 7 in which said first signal is an analog signal, and in which said delay means comprises a series of discrete analog storage means for time-sequential values of said first signal, and means responsive to the velocity towards said working means of said material to shift the stored values of said first signal through said series of analog storage means at a rate commensurate with such velocity.

9. A control system for a rolling mill installation wherein a moving strip of material is reduced in gage, said installation including an input thickness gauge to provide a signal $\Delta G_1$ representative of the actual deviation in the input gage of said strip from a nominal value $\overline{G}_1$ for such input gate, and said installation further including adjustable means to control the reduction in gage of said strip and, also separate velocity sensing means disposed on opposite sides of such mill to provide $L_1$ and $L_2$ signals representative of, respectively, the approaching and leaving velocities relative to said mill of said strip, said system comprising, a ratio unit responsive to said $L_1$ and $L_2$ signals to derive a $\Delta R$ signal representative of the actual deviation in the draft ratio characterizing said strip in the course of said gage reduction thereof from a nominal value $\overline{R}$ for said draft ratio, means to weight and $\Delta R$ signal in accordance with the value $\overline{G}_1$ so as to produce a $\overline{G}_1 \Delta R$ signal, means to weight said $\Delta G_1$ signal in accordance with the value $\overline{R}$ so as to produce a $\overline{R} \Delta G_1$ signal, and signal-combining means responsive to said $\overline{G}_1 \Delta R$ and $\overline{R} \Delta G_1$ signals to derive for control of said adjustable means a correction signal of which at least a component is a $\Delta G_2$ signal representative of the inferred deviation in the output gage of said strip from a nominal value $\overline{G}_2$ for such output gage.

10. A system as in claim 9 in which said installation includes an output thickness gauge to provide a $\Delta G_{2a}$ signal representative of the actual deviation in said output gage from said nominal value $\overline{G}_2$, said system further comprising means to supply said $\Delta G_{2a}$ signal as an input to said signal-combining means as to render said correction signal a function both of said $\Delta G_2$ signal and said $\Delta G_{2a}$ signal.

11. A system as in claim 9 in which said system further comprises means responsive to said $\Delta R$ and $\Delta G_1$ signals to derive a $\Delta R \Delta G_1$ signal, and means to supply said $\Delta R \Delta G_1$ signal as an input to said signal-combining means.

12. A system as in claim 9 in which said $L_1$ and $L_2$ signals are analog pulse signals, and in which said ratio unit comprises a digital ratio counter and means to derive said $\Delta R$ signal in analog form from the digital output of said ratio counter.

References Cited
UNITED STATES PATENTS

| | | | |
|---|---|---|---|
| 2,516,189 | 7/1950 | Dinsmore | 235—92 |
| 2,651,204 | 9/1953 | Dickinson | 235—92 |
| 2,672,284 | 3/1954 | Dickinson | 235—92 |
| 2,960,268 | 11/1960 | Chope et al. | 235—151.13 |
| 3,169,424 | 2/1965 | Branscom et al. | 72—9 |
| 3,319,444 | 5/1967 | Masterson | 72—8 |

CHARLES W. LANHAM, *Primary Examiner.*

A. RUDERMAN, *Assistant Examiner.*